United States Patent
Hashimura et al.

(10) Patent No.: US 8,409,725 B2
(45) Date of Patent: Apr. 2, 2013

(54) STRUCTURAL MEMBER OF DIFFERENT MATERIALS

(75) Inventors: Toru Hashimura, Kobe (JP); Koji Fukumoto, Kobe (JP); Naoto Takahashi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 846 days.

(21) Appl. No.: 12/527,874

(22) PCT Filed: Mar. 26, 2008

(86) PCT No.: PCT/JP2008/055706
§ 371 (c)(1),
(2), (4) Date: Aug. 20, 2009

(87) PCT Pub. No.: WO2008/123299
PCT Pub. Date: Oct. 16, 2008

(65) Prior Publication Data
US 2010/0098969 A1    Apr. 22, 2010

(30) Foreign Application Priority Data

Mar. 28, 2007 (JP) ................... 2007-085310
Mar. 28, 2007 (JP) ................... 2007-085311

(51) Int. Cl.
*B32B 7/04* (2006.01)
*B32B 15/18* (2006.01)
*B32B 15/20* (2006.01)

(52) U.S. Cl. .............. 428/653; 428/594; 428/683
(58) Field of Classification Search .............. None
See application file for complete search history.

(56) References Cited

U.S. PATENT DOCUMENTS

| | | | | |
|---|---|---|---|---|
| 6,139,974 | A * | 10/2000 | Atkinson et al. | 428/595 |
| 6,878,432 | B2 * | 4/2005 | Ueda et al. | 428/174 |
| 2003/0188492 | A1 * | 10/2003 | Bonnett et al. | 49/502 |
| 2005/0247687 | A1 * | 11/2005 | Wang et al. | 219/137 R |

FOREIGN PATENT DOCUMENTS

| | | |
|---|---|---|
| DE | 198 43 824 A 1 | 3/2000 |
| DE | 10 2005 012 778 A1 | 11/2006 |
| JP | 7 117727 | 5/1995 |
| JP | 7 328774 | 12/1995 |

(Continued)

OTHER PUBLICATIONS

Office Action issued Nov. 2, 2010, in Japan Patent Application No. 2007-085311 (with English-language Translation).

(Continued)

*Primary Examiner* — Jennifer McNeil
*Assistant Examiner* — Jason Savage
(74) *Attorney, Agent, or Firm* — Oblon, Spivak, McClelland, Maier & Neustadt, L.L.P.

(57) ABSTRACT

The invention provides a structural member of different materials having no different-material-bonded part between aluminum alloy material and steel material to be assembled. The structural member of different materials comprised of steel and aluminum alloy includes a first structural member including steel, and a second structural member having a part including steel and a part including aluminum alloy, the part including steel and the part including aluminum alloy being bonded by different-material bonding. The first structural member and the second structural member are bonded together only by bonding of steels between the part including steel of the second structural member and the first structural member.

14 Claims, 5 Drawing Sheets

FOREIGN PATENT DOCUMENTS

| | | |
|---|---|---|
| JP | 9 155561 | 6/1997 |
| JP | 2002-67939 | 3/2002 |
| JP | 2002 67939 | 3/2002 |
| JP | 2003 236673 | 8/2003 |
| JP | 2004-51065 | 2/2004 |

OTHER PUBLICATIONS

Extended Search Report issued Nov. 3, 2010 in EP Application No. 08738894.8.

* cited by examiner

STRUCTURAL MEMBER OF DIFFERENT MATERIALS

TECHNICAL FIELD

The present invention relates to a structural member of different materials which includes a combination of an aluminum alloy material and a steel material. The term aluminum alloy panel or steel panel as used in the present specification includes not only a single plate panel, but also a panel structural member (panel structure) composed of an outer panel and an inner panel. Therefore, the term structural member of different materials as used in the present invention may respectively include a combination of single plate panels of an aluminum alloy panel and a steel panel, a combination of panel structural members, and a combination of a single plate panel and a panel structural member.

The structural member of different materials in the invention has no or a small area of a different-material-bonded part between the aluminum alloy material and the steel material to be assembled. Thus, the structural member of the invention is suitably applied to a structure member that has a high probability of assembling the aluminum alloy material and steel material such as in the transportation field including vehicles or trains, mechanical parts, or building structures.

BACKGROUND ART

The use of an aluminum alloy material together with a structural member (steel structural member) using a steel material of a vehicle or the like can reduce the weight of the structural member, thus contributing to reduction in weight of the entire vehicle. The term aluminum alloy material as used herein collectively means pure aluminum and an aluminum alloy, and includes a rolled sheet, an extrusion, a forged material, a cast material, and the like. The term steel material collectively means a steel sheet, a steel die material, a bar steel, and the like.

Steel panel structures placed on a side body of the vehicle are required to have adequate deformation resistance and buckling resistance to side impact and offset front impact, for which standards have become more strict in recent years so as to protect passengers in a vehicle compartment, as well as adequate stiffness and strength which are basic properties. Such steel panel structures are a side sill, a rocker, a pillar, a door, and the like, each being comprised of a panel structure including an outer panel and an inner panel.

In order to ensure impact resistance, that is, to ensure strength for suppressing crush, buckling, or deformation based on new impact standards, it is advantageous to use the aluminum alloy material as a reinforcing member for any steel structural member, such as a panel structure. For example, the aluminum alloy material is interposed as the reinforcing material between the outer panel and the inner panel constituting the steel structural member, which can advantageously improve the deformation resistance and buckling resistance to the side impact and the like.

The reinforcing member of aluminum alloy can exhibit a reinforcing effect by being thicken because of its light weight. In this point, the aluminum alloy reinforcing member is extremely advantageous as compared to a reinforcing member made of a high-tensile material with high strength (high-strength steel sheet). When the same level of reinforcing effect is intended to be achieved by thickening the high-tensile material, a number of (a plurality of) high-tensile materials need to be laminated due to the limited thickness of one high-tensile material itself obtained by thickening. This results in an increase in number of parts, and a great increase in weight. That is, the aluminum alloy reinforcing member can suppress the increase in weight to the minimum level due to addition of the reinforcing member as compared to the steel reinforcing member which can achieve the same level of effect. Furthermore, the aluminum alloy reinforcing member can reduce the number of assembly members without increasing the number of parts.

Thus, for example, the following examples are known and employed as a bonded body of different materials provided by welding and bonding the steel material and aluminum material in the vehicle body:

(1) a door beam (reinforcement of aluminum alloy hollow structure), and a door panel made of steel;

(2) reinforcement by an aluminum alloy hollow structure into a steel panel structural member, such as a steel center pillar or a side sill;

(3) a steel bumper or side member, or a bumper stay or crushable box of an aluminum alloy hollow structure;

(4) alloying an inner panel or outer panel of a steel panel structural member in a large-sized panel, such as a hood or a door, with an aluminum alloy; and (5) a roof panel of an aluminum alloy plate, a steel side member outer, and a steel roof side rail.

If the aluminum alloy material and the steel material can be spot welded to each other in use of the aluminum alloy material, a spot welding process for use of only the steel material can be executed as it is in assembling a body for the vehicle or the like. This advantage becomes great in a large-sized panel, such as the roof, hood, or door, among the above applications when the spot welding can be performed on a different-material-bonding member (different material bonding panel) with a large different-material bonding area (different-material bonding length) between a panel molded from the aluminum alloy sheet (hereinafter referred to as an aluminum alloy panel or a panel made of aluminum alloy) and a panel molded from the steel sheet (hereinafter referred to as a steel panel or a panel made of steel).

In the case of welding and bonding the steel material and the aluminum material, however, brittle intermetallic compounds tend to be generated in a bonded part, which makes it very difficult to obtain the bonded part (bonding strength) with reliability and high strength. Thus, in the related art, the bonding of the bonded body of different materials is performed by using a bolt, a rivet, an adhesive, or the like. This degrades the efficiency of the above-mentioned assembly process of a vehicle body structure for the vehicle, and thus poses problems including the reliability and cost of a bonding joint, and the like.

In the related art, bonding of the bonded body of different materials is performed together with the bolt, rivet, adhesive, or the like. In many cases, however, the aluminum alloy material may be substituted for one steel material, which is one of steel materials welded and bonded to each other in the related art. Thus, in a manufacturing process of the vehicle body which is established as a production process of welding and bonding, not the welding and bonding method used in the related art, but the above-mentioned different bonding method is employed for the steel material and aluminum material, which remarkably reduces the efficiency of the assembly process of the vehicle body structure.

Accordingly, spot welding methods of such a bonded body of different materials have been hitherto studied well. For example, a spot welding method that can surely bond different materials so as to have high strength without using an expensive cladding material or insert material is disclosed (see Patent Documents 1, 2, and 3). The spot welding method involves superimposing steel sheets and aluminum sheets in the form of multilayer, such as three layers, four layers, or six layers with the aluminum sheet sandwiched between the steel sheets.

In this technique, a superimposed part of the multilayer is held between a pair of electrodes, causing a large current to flow through between the electrodes for a short time thereby to remove a molten part of the aluminum sheet from a spot weld zone. As a result, in a weld bead, the steel sheets are directly bonded to each other without the aluminum sheet, which prevents the generation of intermetallic compounds at a bonding interface. An example of this form is disclosed in which an end edge of the steel sheet is bent back by a hemming process, and at the same time an aluminum sheet is sandwiched between a bent piece and the steel sheet, whereby this three-layered superimposed part is spot welded.

[Patent Document 1]
Japanese Unexamined Patent Publication No. Hei7(1995)-328774

[Patent Document 2]
Japanese Unexamined Patent Publication No. Hei9(1997)-155561

[Patent Document 3]
Japanese Unexamined Patent Publication No. 2003-236673

DISCLOSURE OF THE INVENTION

It is appreciated that these conventional techniques also surely have the effect of improving a bonding strength of a joint by the spot welding. However, taking into consideration the application of the bonded body of different materials (or a welding joint of different materials) which is obtained by welding and bonding the steel sheet and aluminum sheet, to a structural member, such as a vehicle, the joint strength is required to resist a large load (stress) applied to the vehicle at the time of impact or the like. The adequate joint strength or bonding strength for this is not obtained yet by these conventional techniques. As a result, the spot welding between the steel material and the aluminum material has not been put into practical use yet for a structural member, such as the vehicle.

The tendency not to obtain the adequate joint strength or bonding strength is remarkable in the case of a galvanized steel sheet (galvanized steel material) provided by applying electrogalvanizing or molten zinc alloy plating to a surface of a steel sheet. This kind of galvanized steel sheet is widely used for vehicle bodies as is known in the art. Thus, this point is also the main cause for the fact that the spot welding between the steel material and the aluminum material is not put into practical use yet for the structural member, such as the vehicle, as mentioned above.

Accordingly, it is an object of the present invention to provide a structural member of different materials which has no different-material-bonded part between an aluminum alloy panel and a steel panel to be assembled in an assembly process of the structural member of different materials including the aluminum alloy panel bonded to the steel panel.

Means for Solving the Problem

In order to achieve the foregoing object, the invention provides a structural member of different materials including steel and an aluminum alloy. The structural member of different materials comprises a first structural member including steel, and a second structural member having a part including steel and a part including aluminum alloy, the part including steel and the part including aluminum alloy being bonded by different-material bonding, wherein the first structural member and the second structural member are bonded together only by bonding of steels between the part including steel of the second structural member and the first structural member.

The necessary shape of the second structural member as a structural member is preferably formed by the part including aluminum alloy.

The first structural member is a structural member including an outer panel and an inner panel. The second structural member is a member interposed as a reinforcing member between the outer panel and the inner panel, and includes a collar made of a steel sheet and bonded to an outer edge of the aluminum alloy material formed in the necessary shape as the structural member. The second structural member is preferably bonded to at least one of the outer panel and the inner panel of the first structural member via the collar made of the steel sheet.

The aluminum alloy material of the second structural member is preferably anyone of a plate material, an extrusion, and a hollow member.

The structural member of different materials is any one selected from the group consisting of a pillar, a side sill, and a roof side rail.

The first structural member is a steel panel. The part including the aluminum alloy of the second structural member is an aluminum alloy panel, and a collar made of a steel sheet is bonded to an outer edge of the aluminum alloy panel. The first structural member and the second structural member are preferably bonded together via the collar made of the steel sheet.

The aluminum alloy panel and the steel panel preferably form respective individual structural members. In this case, the aluminum alloy panel and the steel panel preferably form the structural member of different materials which includes an outer panel and an inner panel.

The structural member of different materials is preferably a combination of a roof and a roof side rail, or a combination of an outer panel and an inner panel of a panel structural member selected from the group consisting of a hood, a door, a pillar, a side sill, and a roof side rail.

In a method for manufacturing a structural member of different materials according to the invention, after forming a second structural member by different-material bonding between a steel sheet and an aluminum alloy sheet, a first structural member and the second structural member are preferably bonded together by bonding the steel parts.

Preferably, the structural member of different materials is a member used for the vehicle, the second structural member is previously manufactured in a process other than the assembly process of the vehicle body, and the second structural member is bonded to the first structural member together via the part including steel of the second structural member in the assembly process of the vehicle body.

In the invention, the part including steel of the second structural member is previously bonded integrally to the part including aluminum alloy of the second structural member. The part including steel of the second structural member is bonded to the first structural member, which are integrated as a structural member of different materials made of aluminum alloy and steel.

In this way, the flexibility of bonding means for bonding of different materials between the part including steel and the part including aluminum alloy is first ensured without various restrictions on the bonding means, bonding conditions, process conditions, and the like in the assembly process of the vehicle body. Thus, in order to integrate a different-material-bonded part, the selection and combination of various bonding means can be performed to be described later, thereby ensuring the bonding strength even in the different-material bonding. Furthermore, the second structural member comprising the part including steel and the part including aluminum alloy which are previously integrated together can be assembled as one unit or module to the first structural member in the normal assembly process of the vehicle body.

In assembly, the second structural member can be bonded to the first structural member via the part including steel. Thus, the assembly can be performed without intervention of the different-material-bonded part between the aluminum alloy and the steel. A bonded part of the structural member of different materials obtained can be constituted only by the bonded part between the steel materials, or substantially mainly by the bonded part between the steel materials.

Therefore, general bonding means and bonding conditions for the spot welding used for the normal steel materials can be used, and also the same bonding method and device as that used for the normal steel materials can be used, which can improve the efficiency of the production process (line) of the vehicle body even in the use of the aluminum alloy panel. Normally, in the use of an aluminum alloy panel, a large-scale change in production process of a vehicle body made of steel is needed from the viewpoint of problems including bondability or the like. However, the structural member of different materials of the invention does not have such a need. In other words, even the structural member of different materials including the aluminum alloy panel can ensure the same degree of efficiency as that of a panel structural member of the normal steel materials without a change of process or reducing the production efficiency.

The structural member of different materials of the invention can be manufactured in a dedicated (an outside) process other than the normal assembly process for the vehicle body, which makes it easier to adjust the bonding strength of the structural member of different materials, or to manage the structural member, or to change the process, not to mention production efficiency. Thus, special bonding methods, bonding conditions, or heat treatment can be performed so as to obtain the strength and bonding strength close to those of the normal steel materials.

Furthermore, the aluminum alloy structural member having a large thickness of 3 mm or more can be assembled as a reinforcing member for the steel structural member, which can ensure the structural strength of the steel structural member, in particular, the structural strength against impact as a body structural member of the vehicle.

DESCRIPTION OF REFERENCE NUMERALS

Figure 1:
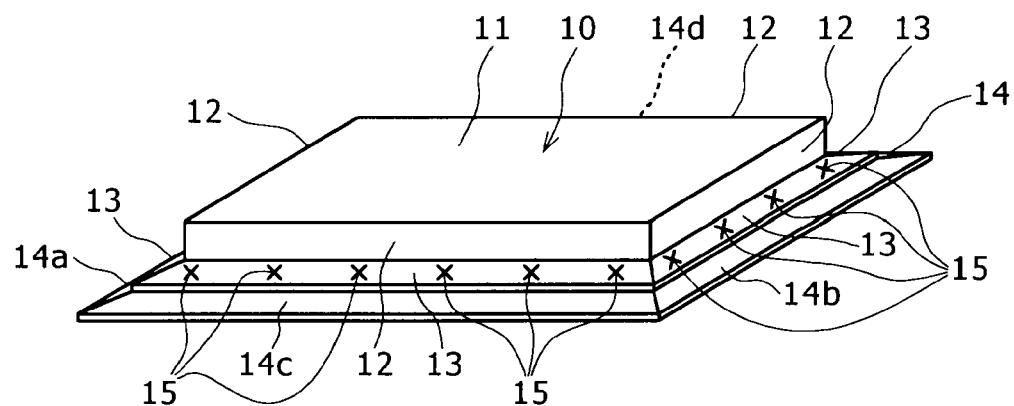
FIG. 1 is a perspective view exemplifying one embodiment of a roof panel made of an aluminum alloy serving as a second structural member according to the invention.

1: outer panel
2: top part
3: longitudinal wall
4: flange
5: inner panel
6: top part
7: longitudinal wall
8: flange
10: aluminum alloy structural member
11: top part
12: longitudinal wall
13: flange
14, 17, 20: collar made of a steel sheet
15: bonded part of different materials
16: bonded part of the same kind of material
18: hollow portion
19: flange

BEST MODE FOR CARRYING OUT THE INVENTION

Preferred embodiments of the invention will be specifically described below.

Figure 2:
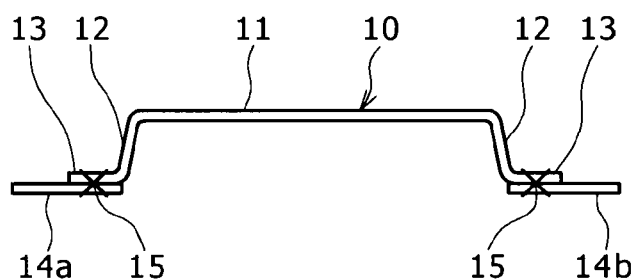
FIG. 2 is a cross-sectional view of FIG. 1.
Figure 3:
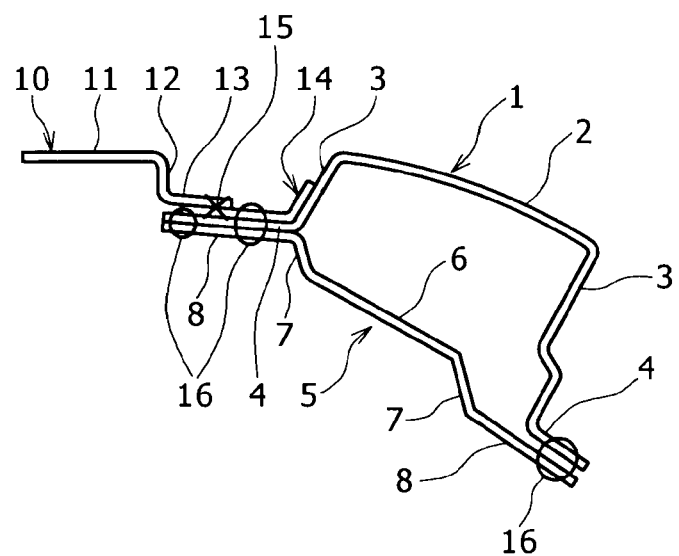
FIG. 3 is a cross-sectional view exemplifying one embodiment of a structural member of different materials of the invention, which is obtained by bonding an aluminum alloy roof panel as the second structural member of the invention to a steel panel as the first structural member.

FIGS. 1 and 2 are a perspective view and a longitudinal cross-sectional view respectively showing an aluminum alloy panel as a second structural member of the invention, which is intended as a roof or the like set on the upper side of the vehicle body. FIG. 3 is a longitudinal cross-sectional view of one embodiment of a structural member of different materials obtained by bonding the aluminum alloy panel to a steel panel (steel panel structural member) serving as the first structural member, such as a roof side rail.

(Aluminum Alloy Panel)

In FIGS. 1 and 2, an aluminum alloy panel 10 is produced by press-molding an aluminum alloy sheet (rolled sheet) with a view to form a structural member, such as a roof. In the press-molding, the aluminum alloy panel 10 has its section formed in a substantially HAT (hat)-type shape which is a necessary shape as the structural member, corresponding to a designed structure or shape, such as the roof. In FIGS. 1 and 2, the left-to-right direction corresponds to the width direction of the whole vehicle body.

The substantially HAT type section of the aluminum alloy roof panel 10 is formed of a substantially flat top part 11, four longitudinal walls 12 respectively overhanging from four surrounding side edges of the top part 11 in the longitudinal direction (downward shown), and four flanges 13 respectively overhanging from the longitudinal walls 12 in the transverse direction (left-to-side direction shown).

(Collar Made of Steel Sheet)

As shown in FIGS. 1 and 2, collars 14 (collar; neck, overhanging piece) made of a steel sheet are integrally attached to the lower sides of the respective four flanges 13 forming the outer edges of such an aluminum alloy panel 10, in the form of overhanging toward the sides of the respective flanges 13 (in the left-to-right direction shown).

The four collars 14 in total made of steel sheets each have the end with flat-plate sectional and planar shapes corresponding to the longitudinal wall 12 and the flange 13 of the panel 10 so as to be easily attached to the aluminum alloy panel 10.

Each collar 14 has the other end formed in such a shape as to be easily bonded to a steel structural member supporting the roof panel. That is, the collar 14 overhangs toward the side (in the left-to-right direction) with respect to the flange 13, while having sectional and planar shapes corresponding to the outer panel 1 or inner panel 5 of the steel panel, such as a roof side rail, for supporting the roof panel from both sides in the width direction of the vehicle body. Further, the collar 14 overhangs in the front-to-back direction (in the left-to-right direction or the like shown) respective to the flange 13 so as to be easily bonded to a reinforcement. The reinforcement (a reinforcing member extending in the width direction of the vehicle body to join the roof side rails on both sides in the width direction of the body, for supporting the roof panel from the lower side) is adapted to support the roof panel from both sides in the longitudinal direction of the body. The collar 14 has sectional and planar shapes corresponding to the roof reinforcement.

In the embodiment shown in FIGS. 1 and 2, the collars 14, 14 made of steel sheets entirely have a flat plate shape corresponding to the outer edge shape formed by the flanges 13 forming the outer edges of the aluminum alloy roof panel 10 side. The collar 14 overhangs toward a steel panel structural member, such as the roof side rail, and the roof reinforcement, and also has one side with a flat plate-like flange shape so as to be bonded to the panel and the roof reinforcement.

The collar 14 made of the steel sheet together with the above-mentioned shape is provided in the aluminum alloy roof panel 10 so as to be easily bonded to the steel panel structural member, such as the roof side rail, and the roof reinforcement. That is, in the embodiment shown in FIG. 1, the collar 14 made of the steel sheet is provided to have a length substantially equal to that of each side of the aluminum alloy panel 10 along the length of each side of the aluminum alloy panel 10. Alternatively, a plurality of collars made of steel sheets may be provided partly and intermittently at intervals along the length of each side of the aluminum alloy panel 10 at each side.

(Different-Material Bonding of Collar Made of Steel Sheet)

The collars 14 made of the steel sheets are previously bonded integrally to the aluminum alloy panel 10 before assembling the aluminum alloy panel 10 to the steel structural member. The point of the invention is that bonding of the collar 14 made of the steel sheet to the aluminum alloy panel 10 is different-material bonding, and previously completed before being assembled to the steel structural member.

Thus, the different-material bonding between the collar 14 made of the steel sheet and the aluminum alloy structural member 10 can be performed separately or independently without having various restrictions on bonding means, bonding conditions, and process conditions in the assembly process of the vehicle body and the like. In other words, the flexibility of bonding means for the different-material bonding between the collar 14 made of the steel sheet and the aluminum alloy panel 10 can be ensured.

Thus, as shown in FIGS. 1 and 2, the different-material-bonded parts exemplified by marks X 15 can be performed by selection and combination of various bonding means, including welding bonding, such as spot welding or FSW, adhesion using an adhesive, a self piercing rivet, and normal bolt and nut. In this point, the selection and combination of the bonding means is performed according to the necessary bonding strength as the reinforcing member based on requested reinforcement properties including resistance to impact of the steel structural member of interest to be reinforced (deformation resistance and buckling resistance). This can assure the bonding strength even of the different-material bonding. In the embodiment shown in FIGS. 1 and 2, the different-material-boded parts are exemplified by the marks X 15. The bonding position and number of the different-material-bonded parts 15 are selected according to the necessary bonding strength and the selected bonding means.

Thus, the collar 14 made of the steel sheet and the aluminum alloy panel 10 which are previously integrated together can be assembled to the steel structural member, such as a center pillar, as one unit or module in the normal assembly process of the vehicle body. In the assembly, the aluminum alloy panel can be bonded to one or both of the outer panel and inner panel of the steel structural members via the collars 14 made of the steel sheets.

Accordingly, the assembly can be performed without intervention of the different-material-bonded part, or via a small area of the different-material-bonded part. A bonded part of the structural member of different materials can be constituted only by the bonded part between the steel materials, or substantially mainly by the bonded part between the steel materials. Therefore, the bonding means and conditions for the spot welding and the like used for the normal steel materials can be employed, leading to an effective production process of the vehicle body, like the case of bonding the normal steel materials. Also, the bonding strength of the structural member of different materials can be made close to that of a structural member of the steel materials.

In the different-material bonding between the collar 14 made of the steel sheet and the aluminum alloy panel 10, resin (layer) is preferably interposed therebetween to insulate both from each other as long as the resin has such a thickness as not to inhibit bonding with welding. This can surely prevent corrosion called "electric corrosion" which may be easily caused at an interface between different kinds of metal components. Without intervention of the resin layer, even after application of coating to the vehicle body, the electric corrosion can be caused due to contact of different kinds of metal components between aluminum alloy components and steel components. As this kind of resin, various kinds of resin widely used or commercially supplied for insulation or corrosion prevention of metal can be used. The necessary thickness of the resin layer is basically pursuant to the usage manual of resin widely used or commercially supplied, but may be very small, for example, 1 to 500 µm.

(Aluminum Alloy Panel)

The aluminum alloy panel 10 is comprised of an aluminum alloy sheet molded into a necessary shape as a panel structural member, such as the above-mentioned roof, a hood, or a door. The aluminum alloy panel 10 shown in FIGS. 1 to 4 is obtained by press-molding, such as bulging, or drawing, the aluminum alloy rolled sheet as described above.

(Aluminum Alloy)

When aluminum alloys used in the panels in the invention are required as the vehicle body, in particular, for the required properties, including reduction in weight, increase in strength, high moldability, and high weldability, aluminum alloys with such excellent properties are selected. For example, an Al—Zn—Mg—Cu alloy or an Al—Zn—Mg alloy (7000 series) is exemplified as the aluminum alloy with excellent strength, an Al—Mg alloy (5000 series) as the aluminum alloy with good moldability and weldability, an Al—Mg—Si alloy (6000 series) as the aluminum alloy having a small amount of alloy elements with excellent recyclability and adequate age-hardenability.

(Steel Material)

A steel material used for the collar made of a steel sheet in the invention is not necessarily the same as the steel structural member to which the steel material is assembled and bonded. Alternatively, a steel material corresponding to the steel structural member, for example, the same kind of steel material as the steel structural member, is selected. Taking into consideration the ease of assembly and bonding of the collar as a reinforcing member to the steel structural member of interest to be bonded, a panel-like shape molded from a steel sheet has the most versatility. Alternatively, the steel material for the collar may be a die steel, a steel pipe, or the like. Further, a mild steel sheet, such as a hot-rolled steel sheet, or a cold-rolled steel sheet (SPCC steel sheet), a high-tensile steel sheet, a bar steel (strip, wire, bar, pipe, and the like), a steel sheet including the above steel material to which surface treatment, such as a zinc coating, is applied, a stainless steel sheet, or the like can be used when necessary. In short, any other steel material which enables a general-purpose weld bonding process, such as a resistance spot welding, may be used. When both of reduction in weight and increase in strength are required, the high-tensile steel may be preferably used.

(Structural Member of Different Materials)

FIG. 3 is a transverse cross-sectional view (a cross-sectional view in the width direction of the vehicle body) of the structural member of different materials, showing an embodiment of the aluminum alloy roof panel 10 of the invention in FIGS. 1 and 2 bonded to the steel panel structural member, such as a roof side rail. In FIG. 2, reference numeral 1 designates a steel outer panel, such as a roof side rail, and reference numeral 5 designates a steel inner panel.

The structure and shape of not only the roof side rail, but also the steel panel structural member (the outer panel 1 and the inner panel 5) side are defined by design of the vehicle body on a manufacturer's side, and thus are not limited at all in the invention. It is noted that the structure common to the panel structural members, such as the roof side rail, is as follows. The outer panel 1 has its section formed in a HAT (hat))-type shape which is a necessary shape as the structural member. The outer panel 1 is composed of a flat top part 2 overhanging toward the side body (upper-rightward shown in the figure), longitudinal walls 3 on both sides, each overhanging from the side edge of the top part 2 in the longitudinal direction (lower-leftward shown in the figure), and both flanges 4, 4 each overhanging from the longitudinal walls 3, 3 in the transverse direction (in the obliquely left-to-right direction shown in the figure).

Also, the inner panel 5 has its section formed in the HAT (hat)-type shape which is a necessary shape as the structural member, like the outer panel 1. In the embodiment shown, the inner panel 5 is composed of a flat top part 6 overhanging toward the inside of the vehicle body (lower-leftward shown in the figure), longitudinal walls 7, 7 on both sides, each overhanging from the side edge of the top part 6 in the longitudinal direction (vertically shown in the figure), and flanges 8, 8 on both sides, each overhanging from the longitudinal walls 7, 7 in the transverse direction (in the obliquely left-to-right direction shown in the figure).

In FIG. 3, the bonded parts represented by the marks o 16 are bonded parts made of the same kind of steel material, that is, between the collar 14*b* made of a steel sheet of the aluminum alloy panel 10 and the flange 4 of the outer panel steel sheet 1, and between the collar 14*b* of the steel sheet and the flange 8 of an inner panel steel sheet 5. The bonded part represented by the mark X 15 is a different-material-bonded part between the collar 14*b* of the steel sheet described in FIG. 1 and the flange 13 of the aluminum alloy panel 10.

The bonded parts of the same kind of material represented by the marks o 16 can be formed by use of general-purpose bonding means for normal steel materials, such as spot welding, and can assure the bonding efficiency and strength regardless of the use of the aluminum alloy panel 10, which is a great advantage. The position and number of the bonded parts of the same kind of material, and the bonding position thereof to the inner panel steel sheet 5 are selected according to the necessary bonding strength as the above reinforcing member and the designed shape of the parts when necessary. In some cases, the collar 14 made of the steel sheet may be bonded only to the inner panel steel sheet 5, or only to the outer panel steel sheet 1, or the like.

In this embodiment, the aluminum alloy panel 10 is bonded to the steel outer panel 1, such as a roof side rail, the steel inner panel 5, and the like via the collars 14 made of steel sheets at the bonded parts of the same kind of material represented by the marks o 16. In some cases except for this embodiment, the aluminum alloy panel 10 may be directly bonded by different-material bonding to the steel outer panel 1, such as the roof side rail, and the steel inner panel 5, whose necessity itself is small.

FIG. 3 shows only a half of the form of bonding the aluminum alloy roof panel 10 to the steel panel structural member, such as a roof side rail, on one side of the vehicle body of the roof panel 10 (on either right or left side thereof). The form on the other half side of the roof panel 10 (on the collar 14*a* side made of the steel sheet as described with reference to FIG. 1) is bilaterally symmetric to and the same as that on one side. The collars 14*c* and 14*d* (not shown) made of the steel sheets on the front and back sides of the vehicle body in the aluminum alloy roof panel 10 are also bonded to the steel roof reinforcement, like the case of the steel panel structural member, such as the roof side rail.

(Other Embodiments)

The other embodiments that combine an outer panel and an inner panel of a panel structural member selected from the group consisting of a hood, a door, a pillar, a side sill, and a roof side rail will be described as the structural member of different materials of the invention.

Figure 4:
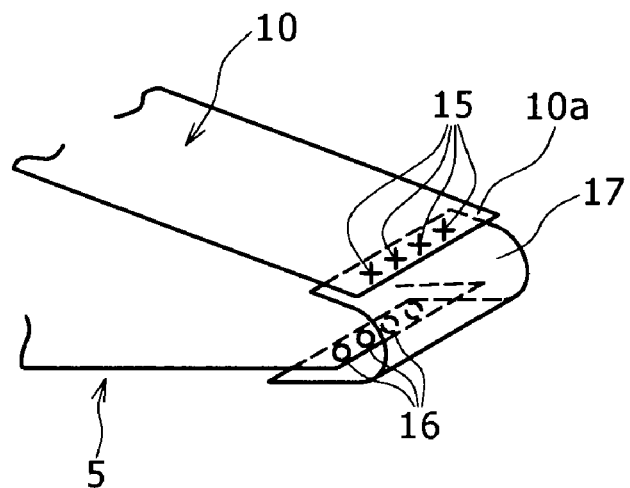
FIG. 4 is a perspective view exemplifying one embodiment of a different-material hood panel structural member of the invention, which is obtained by bonding an aluminum alloy panel as the second structural member of the invention to a steel inner panel as the first structural member.
Figure 5:
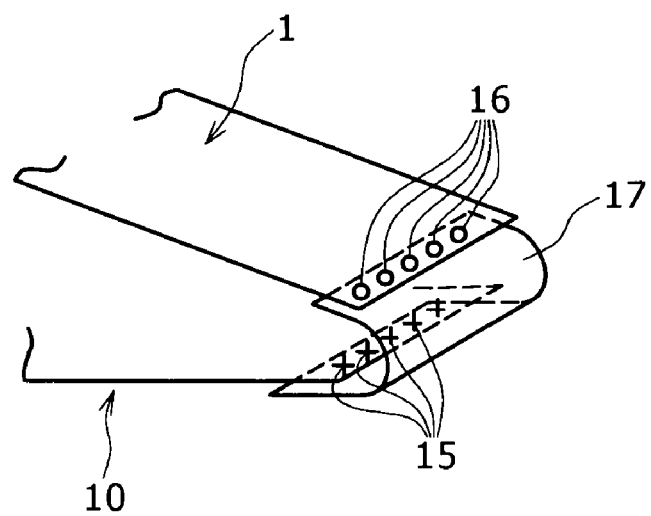
FIG. 5 is a perspective view exemplifying another embodiment of a different-material hood panel structural member of the invention, which is obtained by bonding the aluminum alloy panel as the second structural member of the invention to a steel outer panel as the first structural member.

FIGS. 4 and 5 show an embodiment of the structural member of different materials, in particular, of the hood. Referring to FIG. 4 among them, the use of the aluminum alloy roof panel 10 (second structural member) as the outer panel of the hood together with the steel inner panel 5 (first structural member) forms the structural member of different materials of the hood.

In contrast, referring to FIG. 5, the use of the aluminum alloy roof panel 10 (second structural member) as the inner panel of the hood together with the steel outer panel 1 (first structural member) forms the structural member of different materials of the hood.

As shown in FIGS. 4 and 5, a hem portion of an outer edge of the outer panel (curved portion: a flat hem portion or a roped hem portion) is formed by the collar 17 made of a steel sheet. That is, as shown in FIG. 4, the collar 17 made of a steel sheet and molded so as to previously constitute the hem portion is bonded by different-material bonding to the outer edge 10a of the aluminum alloy panel 10 serving as the outer panel of the hood at parts represented by the marks X 15. Like FIG. 5, the collar 17 made of a steel sheet may be molded so as to constitute the hem portion after the different-material bonding.

As shown in FIG. 5, the collar 17 made of a steel sheet and molded so as to previously constitute the hem portion is bonded by different-material bonding to the outer edge 10a of the aluminum alloy panel 10 serving as the inner panel of the hood at parts represented by the marks X 15.

As shown in FIGS. 4 and 5, the steel panel, such as the inner panel 5 or outer panel 1 of the hood, is bonded at the bonded parts of the same kind of material represented by the mark o 16 by general-purpose bonding means for normal steel materials, such as spot-welding.

Figure 6:
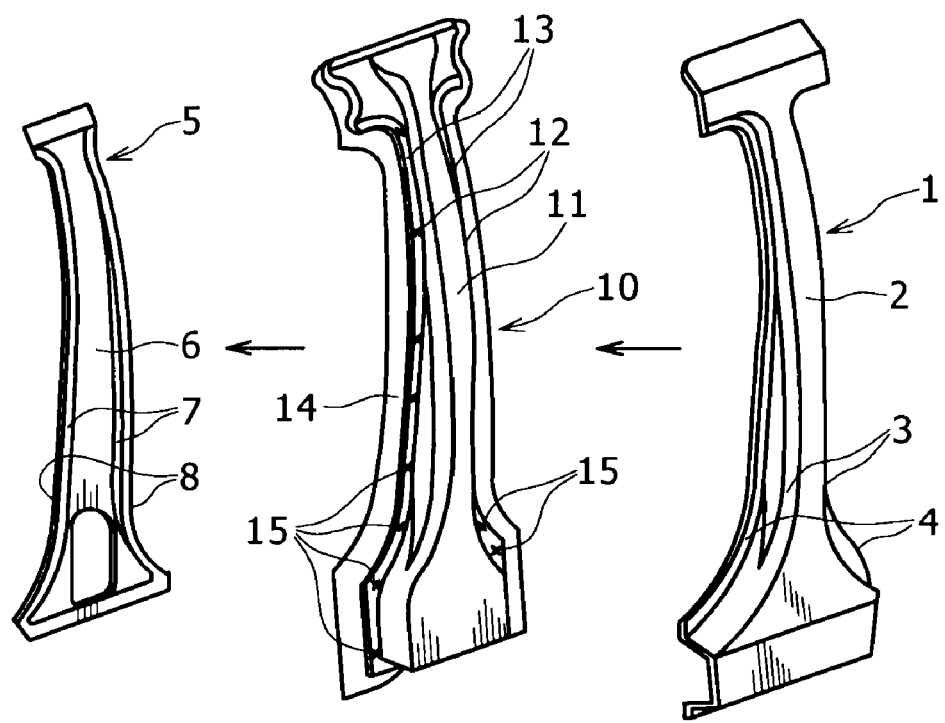
FIG. 6 is a perspective view exemplifying one embodiment of a structural member of different materials of the invention, which is obtained by bonding an aluminum alloy structural member as the second structural member of the invention to a steel structural member as the first structural member.
Figure 7:
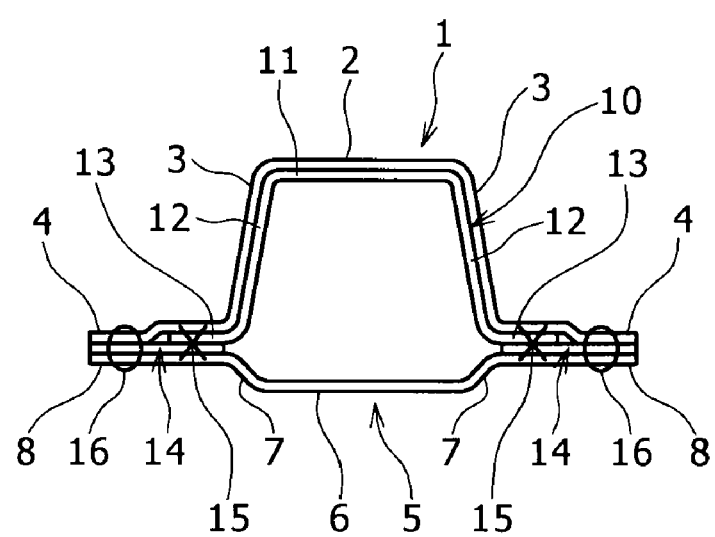
FIG. 7 is a cross-sectional view of FIG. 6.
Figure 8:
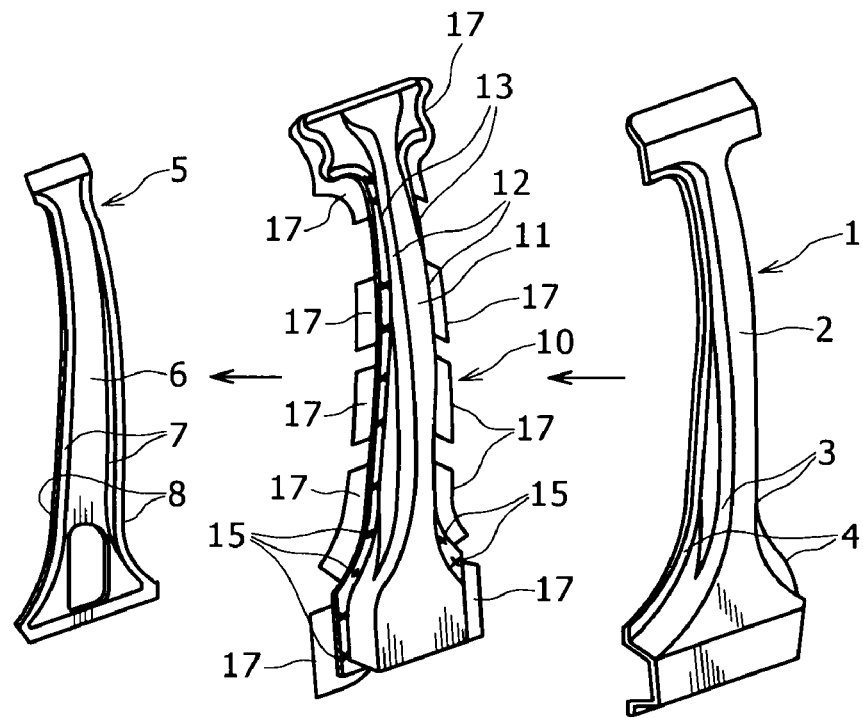
FIG. 8 is a perspective view exemplifying another embodiment of a structural member of different materials of the invention, which is obtained by bonding an aluminum alloy structural member as the second structural member of the invention to a steel structural member as the first structural member.
Figure 9:
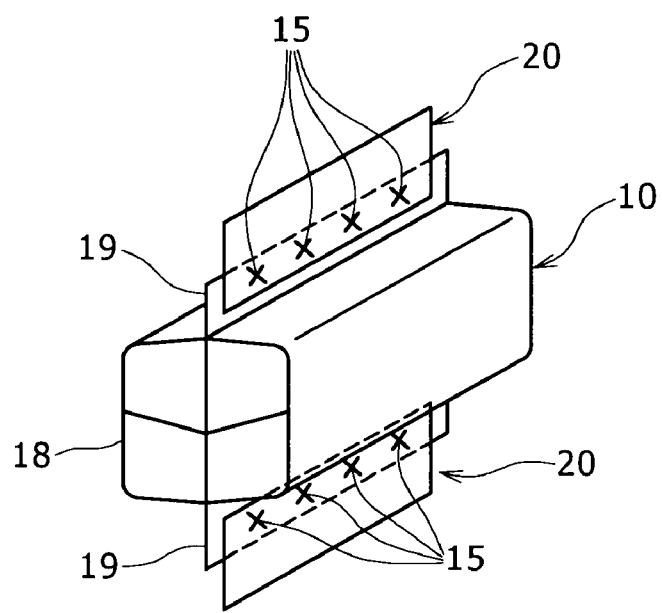
FIG. 9 is a perspective view exemplifying another embodiment of an aluminum alloy structural member serving as the second structural member of the invention.
Figure 10:
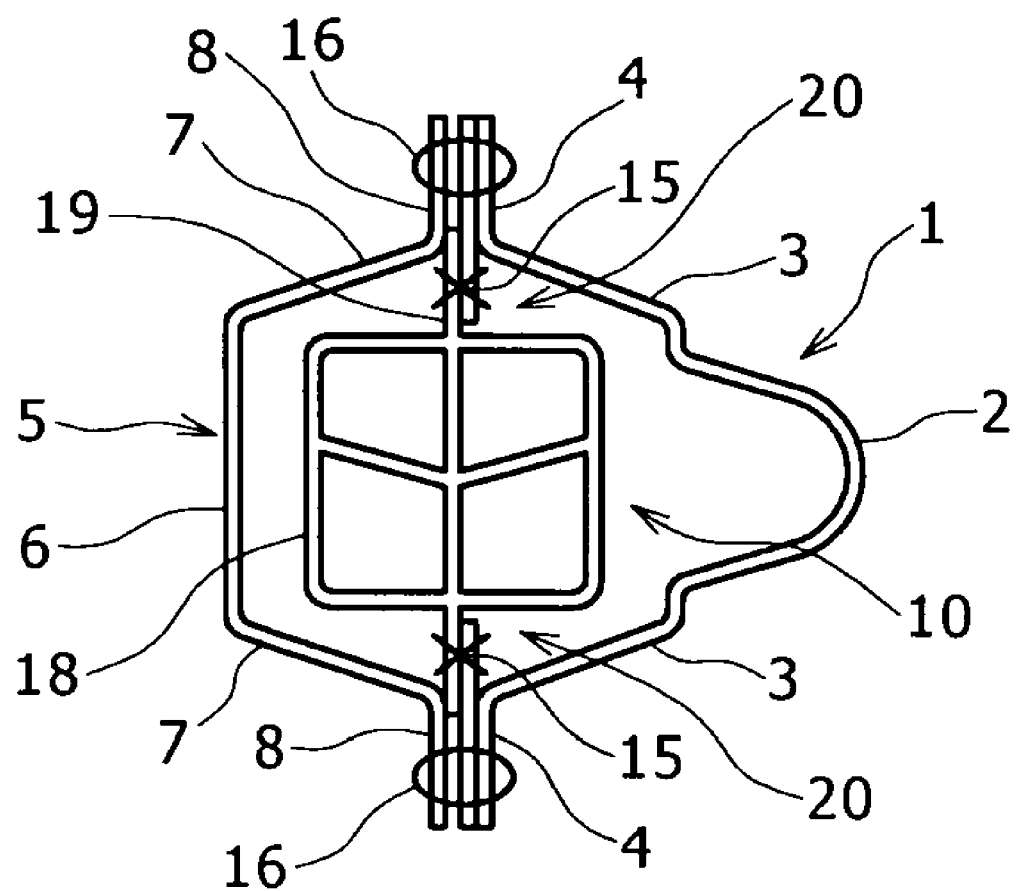
FIG. 10 is a cross-sectional view exemplifying a further embodiment of a structural member of different materials of the invention which is obtained by bonding the aluminum alloy structural member as the second structural member shown in FIG. 9 to the steel structural member as the first structural member.

Other embodiments of the invention will be specifically described below. FIGS. 6 and 7 are a perspective view and a transverse cross-sectional view, respectively, showing one embodiment of an aluminum alloy structural member as a second structural member of the invention, and of a structural member of different materials provided by bonding the aluminum alloy structural member to a steel structural member as the first structural member. FIG. 8 is a perspective view showing another embodiment of an aluminum alloy structural member of the invention shown in FIG. 6. Furthermore, FIGS. 9 and 10 are a perspective view and a transverse cross-sectional view, respectively, showing another embodiment of an aluminum alloy structural member as the second structural member of the invention, and of a structural member of different materials provided by bonding the aluminum alloy structural member to a steel structural member as the first structural member.

(Aluminum Alloy Structural Member)

The aluminum alloy structural member of the invention shown in FIGS. 6 and 7 is exemplified as an embodiment which intends to reinforce a center pillar (B pillar) serving as the steel panel structural member set on, in particular, the vehicle side body.

In FIGS. 6 and 7, the aluminum alloy structural member 10 is interposed as a reinforcing member between the outer panel 1 and the inner panel 5 constituting the center pillar (steel structural member). Based on this arrangement, the aluminum alloy structural member 10 has its section formed in a substantially HAT(hat)-type shape which is a necessary shape as the structural member, corresponding to the structure and shape of the center pillar.

The HAT-type section of the aluminum alloy structural member 10 is formed by the flat top part 11, the longitudinal walls 12, 12 on both sides, each overhanging from the side edge of the top part 11 in the longitudinal direction (in the rear direction shown), and the flanges 13, 13 on both sides, each overhanging from the longitudinal walls 12, 12 in the transverse direction (in the left-to-right direction shown).

The HAT-type sectional shape is formed such that the HAT-type part is widen toward the end in the transverse direction (in the left-to-right direction shown) as it goes downstream without having the same dimension in the longitudinal direction, corresponding to the structure and shape of the center pillar incorporated. Such a shape is easily obtained by press-molding an aluminum alloy rolled sheet or a flat plate-like extrusion.

(Collar Made of Steel Sheet)

The collars 14, 14 (collar, overhanging piece) made of steel sheets are respectively attached integrally to the longitudinal walls 12, 12 and the flanges 13, 13 forming the outer edges of the aluminum alloy structural member 10 in the form of overhanging toward the sides of the flanges 13, 13 (in the left-to-right direction shown). Each of the collars 14, 14 made of the steel sheet has its end formed in sectional and planar shapes corresponding to the longitudinal wall 12 and the flange 13 of the HAT-type section so as to be easily attached to the aluminum alloy structural member 10. The collar 14 has its other end formed in sectional and planar shapes corresponding to the outer panel 1 and the inner panel 5, while overhanging from the flange 13 with the HAT-type section in the transverse direction (in the left-to-right direction shown) so as to be easily bonded to the outer panel 1 and the inner panel 5 constituting the center pillar.

In the embodiment shown in FIGS. 6 and 7, the collars 14, 14 made of the steel sheets entirely have a substantially L-like sectional shape corresponding to an outer edge shape formed by the longitudinal walls 12, 12 and the flanges 13, 13 for forming the outer edges on the aluminum alloy structural member 10 side. The collar overhangs toward the outer panel 1 and the inner panel 5 constituting the center pillar, and has a flat plate-like flange shape on the bonding side to these panels.

The collars 14, 14 made of the steel sheets are provided with the above-mentioned shape in the aluminum alloy structural member 10 so as to be easily bonded to the outer panel 1 and the inner panel 5 constituting the center pillar. That is, in the embodiment shown in FIG. 6, the collars 14, 14 made of the steel sheets have the substantially same length as that of the aluminum alloy structural member 10 in the longitudinal direction, and are provided in the longitudinal direction of the aluminum alloy structural member 10. In contrast, for example, as shown in the embodiment of the steel sheet collars 17, 17 in FIG. 8, a plurality of collars made of steel sheets may be provided partly and intermittently at intervals along the longitudinal direction of the aluminum alloy structural member 10.

(Different-Material Bonding of Collar Made of Steel Sheet)

The collars 14, 14 made of the steel sheets are previously bonded integrally to the aluminum alloy structural member 10 before being assembled of the aluminum alloy structural member 10 to the steel structural member. The point of the invention is that bonding of the collars 14, 14 made of the steel sheets to the aluminum alloy structural member 10 is different-material bonding and previously completed in a process other than the assembly process of the vehicle body before the aluminum alloy structural member is assembled to the steel structural member.

Thus, the different-material bonding between the collars 14, 14 made of the steel sheets and the aluminum alloy structural member 10 can be performed separately or independently without having various restrictions on bonding means, bonding conditions, and process conditions in the assembly process or the like of the vehicle body. In other words, the flexibility and bonding strength of bonding means for different-material bonding between the collars 14, 14 made of the steel sheets and the aluminum alloy structural member 10 is ensured.

Thus, as shown in FIGS. 6 and 7, the different-material-bonded parts exemplified by marks X 15 between the collars 14, 14 made of steel sheets and the aluminum alloy structural member 10 can be provided by selection and combination of various bonding means, including welding bonding, such as spot welding or FSW, adhesion using an adhesive, a self piercing rivet, and normal bolt and nut. In this point, the selection and combination of the bonding means is performed according to the necessary bonding strength as the reinforcing member based on requested reinforcement properties including resistance to impact of the steel structural member of interest to be reinforced (deformation resistance and buckling resistance). Thus, the bonding strength can be ensured even in the different-material bonding. In the embodiment shown in FIGS. 6 and 7, the different-material-bonded parts exemplified by the marks X 15 are disposed in two positions in the traverse direction on the part 14a of the collar 14 (two positions of the longitudinal wall 12 and the flange 13 of the aluminum alloy structural member 10) made of the steel sheet, and in a plurality of positions in the longitudinal direction along the lengthwise direction of the collar 14 made of the steel sheet. The positions and number of the different-material-bonded parts are selected according to the necessary bonding strength as the above reinforcing material and the bonding means selected.

In the above-mentioned embodiment, the steel sheet collars 14, 14 made of the steel sheets and the aluminum alloy structural member 10 which are previously integrated together can be assembled as one unit or module to the steel structural member, such as a center pillar, in a normal assembly process of the vehicle body. By the assembly, the aluminum alloy structural member can be bonded either or both of the outer panel and the inner panel of the steel structural member via the collars 14, 14 made of the steel sheets.

Accordingly, the assembly can be performed without intervention of the different-material-bonded part of the structural member of different materials, or via a small area of the different-material-bonded part. A bonded part of the structural member of different materials can be constituted only by the bonded part between the steel materials, or substantially mainly by the bonded part between the steel materials. Accordingly, the effective and low-cost bonding means and conditions of spot welding or the like, which are used for normal steel materials, can be used, which eliminates the necessity of large-scale change in bonding means and conditions, thus leading to an effective production process of the vehicle body, like the case of bonding the normal steel materials. Since the aluminum alloy structural member can be manufactured in the process other than the production process of the vehicle body as mentioned above, the bonding strength of the structural member of different materials can be made close to that of a structural member between steel materials.

In the different-material bonding between the collars 14, 14 made of the steel sheets and the aluminum alloy structural member 10, resin (layer) is preferably interposed therebetween to insulate both from each other as long as the resin has such a thickness as not to inhibit bonding with welding. This can surely prevent corrosion called "electric corrosion" which may be easily caused at an interface between different kinds of metal components. Without intervention of the resin layer, even after application of coating to the vehicle body, the electric corrosion can be caused due to contact of different kinds of metal components between aluminum alloy components and steel components. As this kind of resin, various kinds of resin widely used or commercially supplied for insulation or corrosion prevention of metal can be used. The necessary thickness of the resin layer is basically pursuant to the usage manual of resin widely used or commercially supplied, but may be very small, for example, 1 to 500 μm.

(Aluminum Alloy Material)

The aluminum alloy structural member 10 is made of an aluminum alloy material molded in a necessary shape as a structural member for application to a reinforcing member. The aluminum alloy structural member 10 shown in FIGS. 6, 7, and 8 is obtained by press-molding an aluminum alloy rolled sheet or flat plate-like extrusion which is the aluminum alloy material, as mentioned above.

The form of the aluminum alloy material is selected from the group consisting of a plate, a panel molded from a plate, an extrusion, a hollow member inside an extrusion, and the like according to the necessary shape as the structural member for application to the reinforcing member, moldability into the shape, or a necessary thickness thereof when necessary. For example, the use of a rolled sheet is suitable for application to a structural member having a broad shape or a shape which is easily molded, or a structural member having a sectional shape changed in the longitudinal direction, like a shape of the center pillar widen toward the end as shown in FIGS. 6 and 8. Further, the use of an extrusion can increase the thickness of the aluminum alloy sheet to 3 mm or more, and can thicken only a necessary part thereby to make a difference in thickness so as to enhance an effect of reinforcing by a complicated shape or by thickening.

The aluminum alloy structural member 10 shown in FIGS. 6 to 8 is comprised of a single (one piece of) aluminum alloy sheet in the embodiment. However, the aluminum alloy sheet is not limited to the single one. The double (two pieces of) or triple (three pieces of) aluminum alloy sheets may be superimposed on each other to be integrally bonded together in use, depending on the necessary strength and thickness as the structural member for application to the reinforcement.

(Aluminum Alloy)

Aluminum alloy used for the aluminum alloy sheet is the same as that described in the embodiments with reference to FIGS. 1 to 3, and a description thereof will be omitted below.

(Steel Material)

Steel material used for the collars 14, 14 made of steel sheets is the same as that described in the embodiments with reference to FIGS. 1 to 3, and a description thereof will be omitted below.

(Structural Member of Different Materials)

FIG. 7 shows a transverse cross-sectional view of the structural member of different materials obtained by bonding the aluminum alloy structural member 10 of the invention shown in FIG. 6, to the steel structural member. In FIG. 7, reference numeral 1 designates, for example, a steel outer panel of a center pillar, and reference numeral 5 designates, for example, a steel inner panel of the center pillar.

As shown in FIG. 7, the aluminum alloy structural member 10 is interposed as a reinforcing member in a space between the outer panel 1 and the inner panel 5 which constitute the steel structural member as the center pillar. The structure and shape of not only the center pillar, but also the steel structural member (the outer panel 1 and the inner panel 5) side are defined by design of the vehicle body on the manufacturer's side, and thus are not limited at all in the invention.

It is noted that the structure common to the panel structural members, such as the center pillar, is as follows. The outer panel 1 has its section formed in a HAT (hat)-type shape which is a necessary shape as the structural member. The outer panel 1 is composed of a flat top part 2 overhanging toward the side body (upward shown in the figure), longitudinal walls 3, 3 on both sides, each overhanging from the side edge of the top part 2 in the longitudinal direction (downward shown in the figure), and flanges 4, 4 on both sides, each overhanging from the longitudinal walls 3, 3 in the transverse direction (in the left-to-right direction shown in the figure).

Also, the inner panel 5 has its section formed in a HAT (hat)-type shape which is a necessary shape as the structural member, like the outer panel 1. In the embodiment shown, the inner panel 5 is composed of a flat top part 6 overhanging toward the inside of the vehicle body (downward shown in the figure), longitudinal walls 7, 7 on both sides, each overhanging from the side edge of the top part 6 in the longitudinal direction (vertically shown in the figure), and flanges 8, 8 on both sides, each overhanging from the longitudinal walls 7, 7 in the transverse direction (in the left-to-right direction shown in the figure).

In FIG. 7, the bonded parts represented by the marks o 16 are bonded parts of the same kind of steel material, that is, between the collar 14 made of a steel sheet of the aluminum alloy structural member 10 and the flanges 8, 8 of the inner panel steel sheet 15. The bonded parts represented by the marks X 15 are different-material-bonded parts located in two positions between the collar 14 made of a steel sheet described in FIG. 6 and the longitudinal wall 12 of the aluminum alloy structural member 10, and between the collar 14 and the flange 13 of the structural member 10.

The bonded parts of the same kind of material represented by the marks o 16 can be formed by use of general-purpose bonding means for normal steel materials, such as spot welding, and can assure the bonding efficiency and strength regardless of the use of the aluminum alloy panel 10, which is a great advantage. The position and number of the bonded parts of the same kind of material, and the bonding position thereof to the inner panel steel sheet 5 are selected according to the necessary bonding strength as the above-mentioned reinforcing member and the designed shape thereof. In some cases, as shown in the embodiment of the side sill in FIG. 9, the steel collar 14 may be bonded to the outer panel steel sheet 1 as well as the inner panel steel sheet 5. In this embodiment, the aluminum alloy structural member 10 is bonded to the inner panel steel sheet 5 and the outer panel steel sheet 1 only by the bonded parts of the same kind of material represented by the marks o 16 via the collars 14 of the steel sheets. In some cases except for this embodiment, the aluminum alloy structural member 10 may be directly bonded by different-material bonding to the inner panel steel sheet 5, and the outer panel steel sheet 1 without intervention of the collar 14 made of the steel sheet, whose necessity itself is small.

(Other Embodiments)

FIGS. 9 and 10 show embodiments of reinforcement, such as a side sill or a roof side rail, as other embodiments except for the center pillar of the bonded body of different materials according to the invention.

In FIG. 9, the aluminum alloy structural member 10 which is the second structural member is comprised of an aluminum alloy hollow structure, unlike the panel shapes shown in FIGS. 6 to 8. That is, the structural member 10 is comprised of a hollow portion 18 having a substantially crisscross sectional shape, and flanges 19, 19 each overhanging toward the side from the portion (vertically shown in the figure).

The aluminum alloy structural material 10 can be formed into a complicated shape by making a hollow extrusion in this way. The thickness of the aluminum alloy structural material 10 can be increased to 3 mm or more, which can improve the reinforcing effect. Only a necessary part of the hollow extrusion is thickened, and other parts are thinned, which can reduce the weight.

Also in the embodiment shown in FIG. 9 like the above-mentioned embodiment shown in FIG. 6, the collars 20, 20 made of steel sheets each have substantially L-like sectional and planar shapes corresponding to the shape of the flanges 19, 19 of the aluminum alloy structural member 10 so as to be bonded to the outer panel and the inner panel. The collars 20, 20 of steel sheets may be formed in a flat plate-like shape like the flanges 19, 19.

The collars 20, 20 made of the steel sheets are provided along the longitudinal direction of the aluminum alloy structural member 10, but may be provided partly, or intermittently at intervals along the longitudinal direction of the aluminum alloy structural member 10 as shown in FIG. 8.

In FIG. 10, the aluminum alloy structural member 10 serving as the second structural member is the same as the panel shape shown in FIGS. 6 to 8 in that the structural member is interposed as a reinforcing member in a space between the outer panel 1 and the inner panel 5 which constitutes the steel structural member serving as a first structural member.

In FIG. 10 or FIG. 9, the bonded parts represented by the marks X 15 are different-material-bonded parts previously bonded of the collars 20, 20 made of the steel sheets to the flanges 19, 19 of the aluminum alloy structural member 10. In FIG. 10, the bonded parts represented by the marks o 16 are bonded parts of the same kind of steel material between the collar 20 made of the steel sheet of the aluminum alloy structural member 10 and each of flanges, that is, the flange 8 of the inner panel steel sheet 5 and the flange 4 of the outer panel steel sheet 1.

The outer panel 1 and the inner panel 5 shown in FIG. 10 is the same as those shown in FIGS. 6 to 8 in that the outer and inner panels 1 and 5 has the HAT-type section formed by a top part, longitudinal walls on both side, each overhanging from the side edge of the top part, and flanges on both sides, each overhanging from the longitudinal wall, as the necessary sectional shape of the side sill or roof side rail.

In the embodiments described above, the outer panel 1 and the inner panel 5 which constitute the steel structural member are made of the steel sheets. On the other hand, in another embodiment, one of the outer panel 1 and the inner panel 5 may be made of an aluminum alloy sheet so as to reduce the weight of a steel structural member. In this case, the collar 14, 17, or 20 made of the steel sheet in the aluminum alloy structural member 10 is bonded to any one of the outer panel 1 and the inner panel 5 on the steel sheet side, which is bonding of the same kind of material.

Industrial Applicability

Accordingly, the invention can provide a structural member of different materials which has no or a small area of a different-material-bonded part between an aluminum alloy panel and a steel panel to be assembled in assembling the structural member of different materials including the aluminum alloy panel bonded to the steel panel. Therefore, the way to combine the steel material and the aluminum material into a composite material can be simplified, so that the structural member of different materials can be widely used in the vehicle body or the like. The structural member of different materials is a combination of a roof and a roof side rail, or a combination of an outer panel and an inner panel of a panel structural member selected from the group consisting of a hood, a door, a pillar, a side sill, and a roof side rail.

The invention claimed is:

1. A structural member, comprising:
   (I) a first structural member comprising steel, wherein the first structural member comprises
      (I-a) an outer panel, and
      (I-b) an inner panel; and
   (II) a second structural member comprising
      (II-a) a first part comprising steel, and
      (II-b) a second part comprising an aluminum alloy, wherein the first part and the second part are bonded by different-material bonding, and wherein the first structural member and the second structural member are bonded together only by bonding of steels between the first part of the second structural member and at least one of the outer panel and the inner panel of the first structural member.

2. The structural member of claim 1, wherein a necessary shape of the second structural member as a structural member is formed by the second part.

3. The structural member of claim 2, wherein the second structural member is interposed as a reinforcing member between the outer panel and the inner panel, the second structural member comprising a collar, which is a steel sheet and bonded to an outer edge of an aluminum alloy material formed in the necessary shape as the structural member, and wherein the second structural member is bonded to at least one of the outer panel and the inner panel of the first structural member via the collar.

4. The structural member of claim 3, wherein the aluminum alloy material of the second structural member is an extrusion.

5. The structural member of claim 3, wherein the aluminum alloy material of the second structural member is a hollow material.

6. The structural member of claim 3, which is any one selected from the group consisting of a pillar, a side sill, and a roof side rail.

7. An aluminum alloy structural member employed as the structural member of claim 3, the aluminum alloy structural member having an outer edge thereof bonded to a collar comprising a steel sheet.

8. The structural member of claim 2, wherein the first structural member is a steel panel, wherein the second part of the second structural member is an aluminum alloy panel, and a collar comprising a steel sheet is bonded to an outer edge of the aluminum alloy panel, and wherein at least one of the outer panel and the inner panel of the first structural member and the second structural member are bonded together via the collar.

9. The structural member of claim 8, wherein the aluminum alloy panel and the steel panel form respective individual structural members.

10. The structural member of claim 8, wherein the structural member is a combination of a roof and a roof side rail, or a combination of an outer panel and an inner panel of a panel structural member selected from the group consisting of a hood, a door, a pillar, a side sill, and a roof side rail.

11. An aluminum alloy panel, employed as the structural member of claim 8, the aluminum alloy panel having an outer edge thereof bonded to a collar comprising a steel sheet.

12. The structural member of claim 1, wherein the aluminum alloy material of the second structural member is a plate material.

13. A method for manufacturing the structural member of claim 1, the method comprising:

different-material bonding steel and an aluminum alloy, to obtain the second structural member; and then bonding the steels of at least one of the outer panel and the inner panel of the first structural member and the second structural member.

14. The method of claim 13, wherein the structural member is in the form of a vehicle member, wherein the second structural member is previously manufactured in a process other than an assembly process of a vehicle body, and wherein the second structural member is bonded to the first structural member via the first part of the second structural member in the assembly process of the vehicle body.

* * * * *